US012154422B2

(12) United States Patent
Soji et al.

(10) Patent No.: US 12,154,422 B2
(45) Date of Patent: Nov. 26, 2024

(54) INFORMATION PROCESSING APPARATUS, SYSTEM, NON-TRANSITORY COMPUTER-READABLE STORAGE MEDIUM WITH EXECUTABLE PROGRAM STORED THEREON, AND METHOD

(71) Applicant: NINTENDO CO., LTD., Kyoto (JP)

(72) Inventors: Hiroki Soji, Kyoto (JP); Hirosuke Kinoshita, Kyoto (JP); Tatsuya Fukui, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 228 days.

(21) Appl. No.: 17/834,200

(22) Filed: Jun. 7, 2022

(65) Prior Publication Data

US 2023/0024418 A1 Jan. 26, 2023

(30) Foreign Application Priority Data

Jul. 15, 2021 (JP) ................................. 2021-117381

(51) Int. Cl.
  *G08B 21/24* (2006.01)
  *A63F 13/537* (2014.01)
  *G06F 3/16* (2006.01)

(52) U.S. Cl.
  CPC ............ *G08B 21/24* (2013.01); *A63F 13/537* (2014.09); *G06F 3/165* (2013.01)

(58) Field of Classification Search
  CPC ........ G08B 21/24; A63F 13/537; G06F 3/165
  See application file for complete search history.

(56) References Cited

U.S. PATENT DOCUMENTS

| | | | | |
|---|---|---|---|---|
| 5,480,147 A * | 1/1996 | Ethier | ............... | A63B 24/0021 473/472 |
| 6,264,198 B1 * | 7/2001 | Stamper | .................. | A63F 13/54 463/31 |
| 8,591,332 B1 * | 11/2013 | Bright | .................... | A63F 13/42 463/31 |
| 8,898,803 B1 * | 11/2014 | Hostetter | ............... | G06F 21/10 726/28 |
| 11,751,796 B2 * | 9/2023 | Han | ....................... | A63F 13/46 600/545 |
| 2006/0287080 A1 * | 12/2006 | Bychkov | ................ | A63F 13/95 463/29 |
| 2007/0248235 A1 * | 10/2007 | Hamada | .................. | H04R 1/26 381/99 |

(Continued)

FOREIGN PATENT DOCUMENTS

| | | | |
|---|---|---|---|
| JP | 2017-106872 | | 6/2017 |
| JP | 2019111181 A | * | 7/2019 |
| JP | 2019162309 A | * | 9/2019 |

*Primary Examiner* — Chico A Foxx
(74) *Attorney, Agent, or Firm* — Nixon & Vanderhye, PC

(57) ABSTRACT

An information processing apparatus outputs a sound when an output condition is satisfied, and receives designation information from another information processing apparatus that executes a game application. Output of the sound includes output of a first sound as the sound when timing when the output condition is satisfied is not in a time range based on the designation information and output of a second sound different from the first sound as the sound when the timing when the output condition is satisfied is in the time range based on the designation information.

21 Claims, 13 Drawing Sheets

(56) References Cited

U.S. PATENT DOCUMENTS

| | | | | |
|---|---|---|---|---|
| 2008/0170475 | A1* | 7/2008 | Simon | A63B 71/06 368/109 |
| 2010/0173708 | A1* | 7/2010 | Yamakawa | A63F 13/812 463/43 |
| 2012/0096198 | A1* | 4/2012 | Wolff-Petersen | H04L 41/0806 710/67 |
| 2012/0309512 | A1* | 12/2012 | Abe | A63F 13/26 463/30 |
| 2013/0065654 | A1* | 3/2013 | Matsui | A63F 13/537 463/37 |
| 2013/0123019 | A1* | 5/2013 | Sullivan | A63F 13/35 463/42 |
| 2014/0080561 | A1* | 3/2014 | Knutsson | A63F 13/428 463/10 |
| 2014/0080600 | A1* | 3/2014 | Knutsson | A63F 13/75 463/31 |
| 2014/0141879 | A1* | 5/2014 | Abe | G10H 7/00 463/31 |
| 2016/0317928 | A1* | 11/2016 | Meneses | H04S 3/004 |
| 2020/0137463 | A1* | 4/2020 | Kumar | G06N 3/045 |
| 2020/0147497 | A1* | 5/2020 | Mahlmeister | A63F 13/22 |
| 2022/0062766 | A1* | 3/2022 | Dom | H04S 7/304 |

* cited by examiner

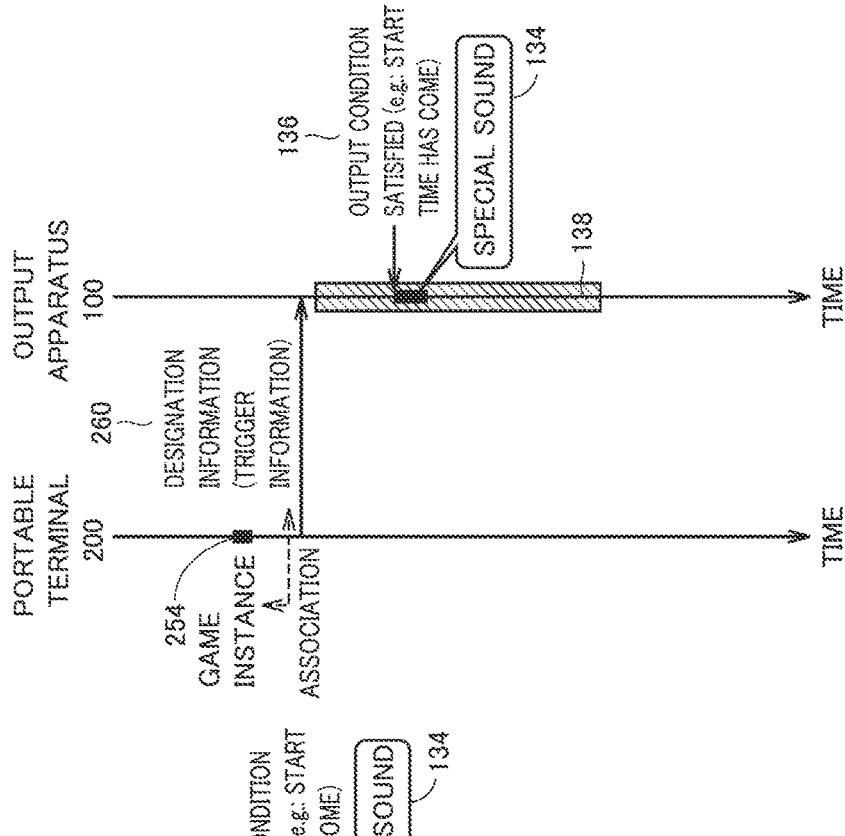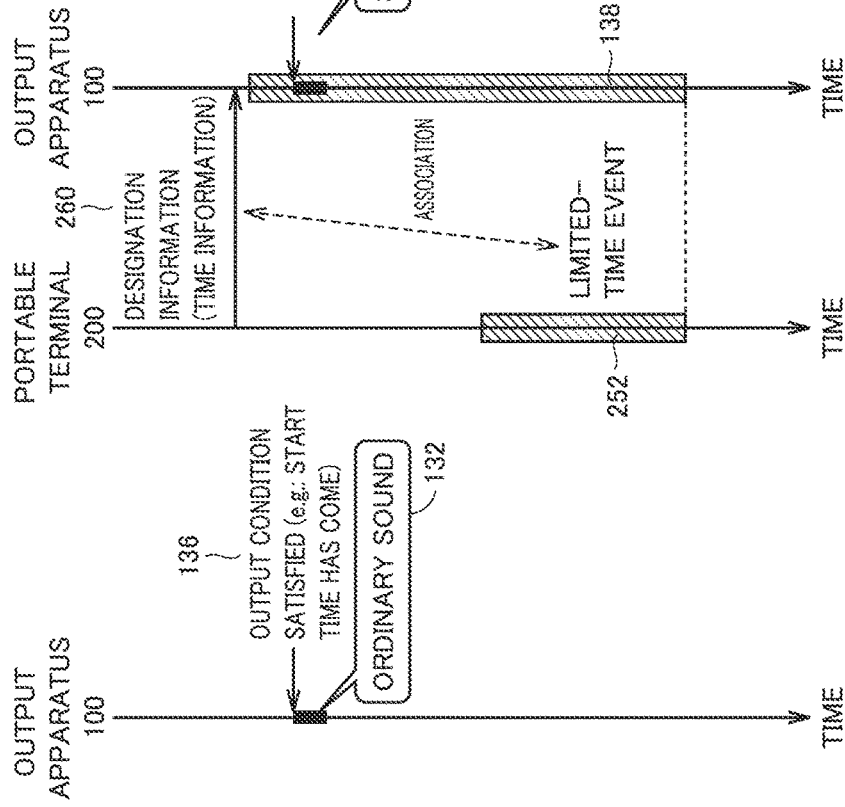

FIG.5A

| IDENTIFICATION INFORMATION | START TIME | ENDING TIME |
|---|---|---|
| 261 | 262 | 263 |

| IDENTIFICATION INFORMATION | START TIME | DURATION |
|---|---|---|
| 261 | 262 | 264 |

| IDENTIFICATION INFORMATION | START TIME | ENDING TIME | SOUND DESIGNATION INFORMATION | PRIORITY INFORMATION | NUMBER-OF-TIMES-OF-OUTPUT MANAGEMENT INFORMATION |
|---|---|---|---|---|---|
| 261 | 262 | 263 | 265 | 266 | 267 |

260

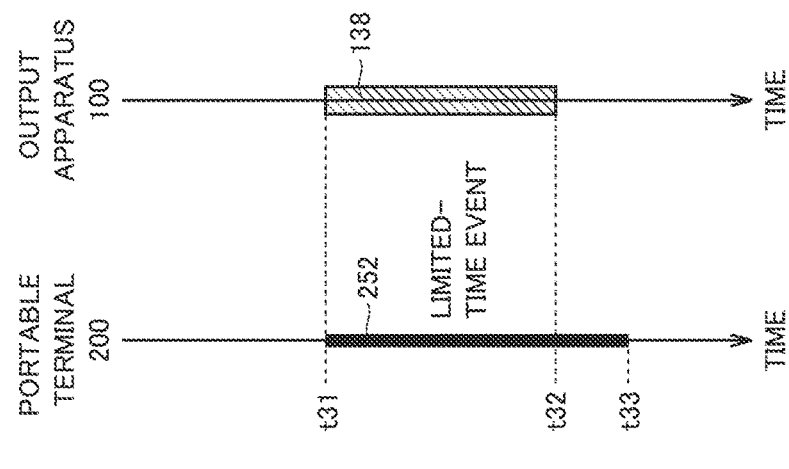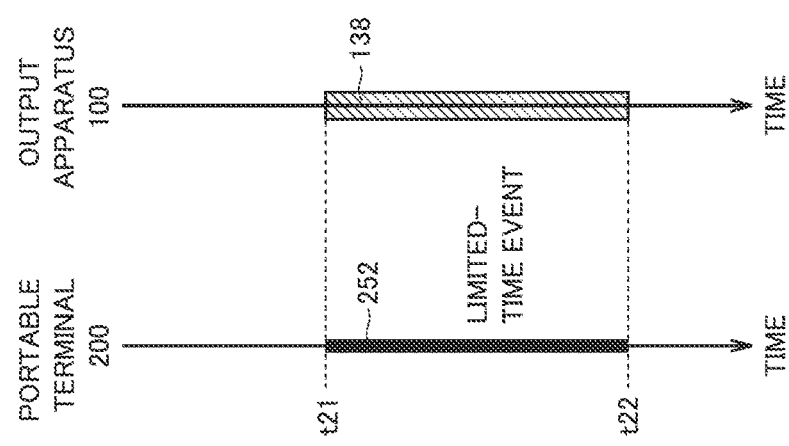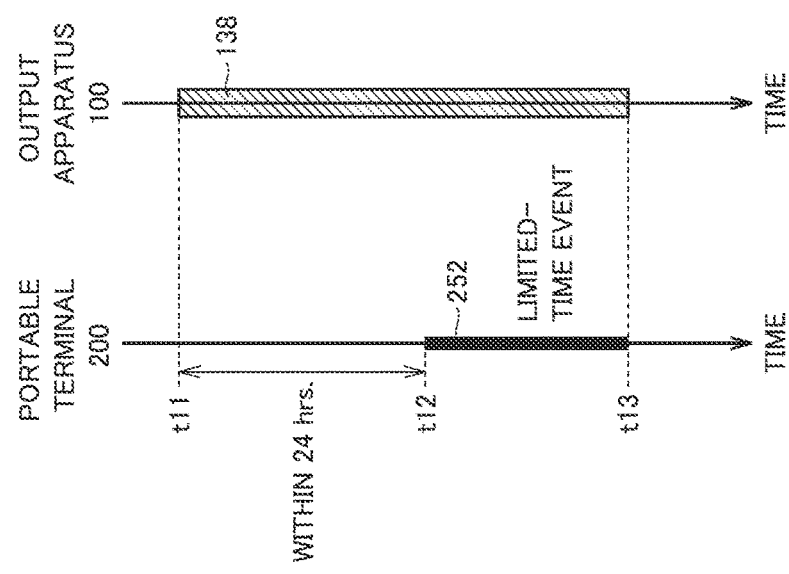

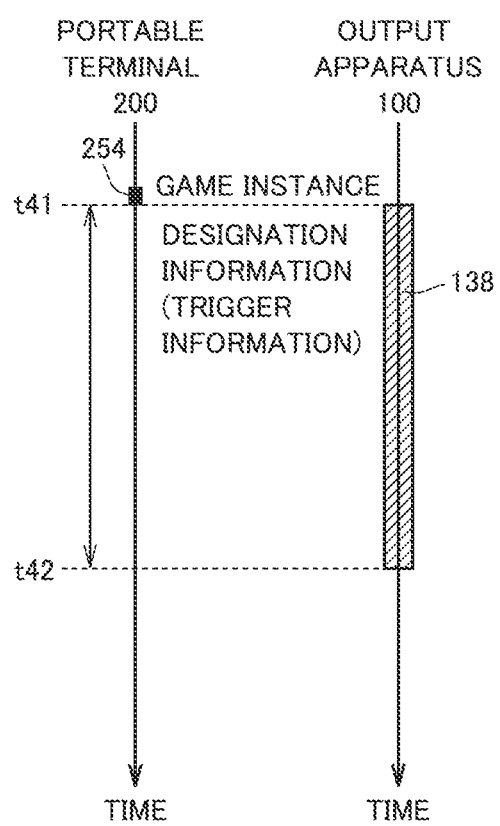

INFORMATION PROCESSING APPARATUS, SYSTEM, NON-TRANSITORY COMPUTER-READABLE STORAGE MEDIUM WITH EXECUTABLE PROGRAM STORED THEREON, AND METHOD

This nonprovisional application is based on Japanese Patent Application No. 2021-117381 filed with the Japan Patent Office on Jul. 15, 2021, the entire contents of which are hereby incorporated by reference.

FIELD

The present disclosure relates to an information processing apparatus configured to output a sound, a system including the information processing apparatus, a medium having a program directed to the information processing apparatus stored thereon, and a method performed in the information processing apparatus.

BACKGROUND AND SUMMARY

An apparatus (for example, an alarm clock) that outputs a sound when programmed time comes has conventionally been available. When some special condition is satisfied in such an apparatus, such processing as outputting a message different from that in an ordinary state may be performed.

For example, processing for output on a prescribed day such as a character's birthday or Christmas, of a prescribed message which is not outputted on other days has been known.

In the known apparatus described above, information such as contents of the special condition and processing to be performed is stored in the apparatus alone, and coordination with another apparatus has not been assumed.

The present disclosure is directed to a scheme to provide various sounds to a user depending on a situation, in coordination with another information processing apparatus.

An exemplary embodiment provides an information processing apparatus that includes a memory storing a computer-readable program and one or more processors. The one or more processors, when executing the computer-readable program, perform outputting a sound when an output condition is satisfied and receiving designation information from another information processing apparatus that executes a game application. The designation information includes at least one of time information based on a prescribed period, of a limited-time event held for the prescribed period in the game application and trigger information based on a game instance that occurs in the game application. The outputting the sound includes outputting a first sound as the sound when timing when the output condition is satisfied is not in a time range based on the designation information and outputting a second sound different from the first sound as the sound when the timing when the output condition is satisfied is in the time range based on the designation information.

According to this configuration, the time range based on the designation information received from another information processing apparatus is set, so that the first sound and the second sound can selectively be outputted in accordance with the timing when the output condition is satisfied. The designation information is generated with progress of the application executed by another information processing apparatus, so that the sound in accordance with progress of the application can be outputted.

The information processing apparatus may be configured to output a plurality of types of sounds in addition to the first sound. At this time, the second sound may be selected from among the plurality of types of sounds. According to this configuration, the outputted second sound can be changed depending on a situation.

The designation information may include information designating a type of the second sound. At this time, the outputting the sound may include outputting the second sound of a type designated by the designation information when the timing when the output condition is satisfied is in the time range based on the designation information. According to this configuration, the type of the second sound to be outputted can freely be selected with progress of the application executed by another information processing apparatus.

The designation information may include information designating a priority. At this time, the outputting the sound may include outputting the second sound of a type designated by one piece of designation information in accordance with the priority among a plurality of pieces of designation information when the timing when the output condition is satisfied is in all of time ranges based on the plurality of pieces of designation information. According to this configuration, even when the time ranges based on the plurality of pieces of designation information overlap with each other, the second sound to be outputted can uniquely be determined.

The outputting the sound may include outputting the first sound instead of the second sound when the second sound has ever been outputted even when the timing when the output condition is satisfied is in the time range based on the designation information. According to this configuration, for example, the second sound or the like output of which a plurality of times is not preferred can be outputted only once.

The designation information may include information designating the number of times of output of the second sound. At this time, the outputting the sound may include outputting the first sound instead of the second sound when the number of times of output of the second sound has reached the number of times designated by the designation information even when the timing when the output condition is satisfied is in the time range based on the designation information. According to this configuration, output of the second sound can be restricted up to the number of times designated in advance.

The output condition may include arrival of time set in advance. According to this configuration, the information processing apparatus can function as an alarm clock.

The output condition may include reception of a prescribed operation by a user. According to this configuration, the sound can be outputted, for example, in response to an operation onto the information processing apparatus by a user.

The time range based on the designation information has, as a beginning, time set within twenty-four hours before start of a period during which the limited-time event is held. According to this configuration, such setting can be made that the second sound is outputted, for example, when it becomes a day of holding of the limited-time event.

The one or more processors, when executing the computer-readable program, may further perform obtaining data for output of the second sound from another information processing apparatus. According to this configuration, a wide variety of types of the second sound can be outputted from the information processing apparatus.

The time information may include at least one of a time range including a period before start of a period during which the limited-time event is held and time before start of the period during which the limited-time event is held. According to this configuration, the second sound can be used to give an advance notice about holding of the limited-time event.

In the limited-time event, when a user defeats an enemy character by an operation by the user, the user may be given a prescribed reward. According to this configuration, the user can be motivated to participate in the limited-time event.

The second sound may include contents that give a notification about holding of the limited-time event. According to this configuration, the user can be invited to participate in the limited-time event.

The time range based on the designation information may coincide with a period during which the limited-time event is held. According to this configuration, since the second sound is outputted during the period for which the limited-time event is held, participation into the limited-time event can be encouraged.

Start of the time range based on the designation information may coincide with start of a period during which the limited-time event is held. According to this configuration, since the second sound is outputted after the limited-time event is started, the user can be notified of holding of the limited-time event in real time.

The time information may include time indicating start of a period. In this case, the time range based on the designation information may be started from the time included in the time information. According to this configuration, by designating time included in the time information, start of the time range can freely be set.

The trigger information may include time after occurrence of the game instance. In this case, the time range based on the designation information may be started from the time included in the trigger information. According to this configuration, start of the time range can freely be set.

The one or more processors, when executing the computer-readable program, may further perform measuring a sleep state of a user. In this case, another information processing apparatus may have the game application progress by using information indicating the measured sleep state of the user. According to this configuration, the game application can progress in accordance with the sleep state of the user and the designation information in accordance with a result of progress can also be generated.

At least one of the first sound and the second sound may include an alarm sound. According to this configuration, the user can be stimulated to get up or notified of holding of an event.

Another exemplary embodiment provides a system that includes a first information processing apparatus and a second information processing apparatus that executes a game application. The first information processing apparatus includes a memory storing a computer-readable program and one or more processors. The one or more processors, when executing the computer-readable program, perform outputting a sound when an output condition is satisfied and receiving designation information from the second information processing apparatus. The designation information includes at least one of time information based on a prescribed period, of a limited-time event held for the prescribed period in the game application and trigger information based on a game instance that occurs in the game application. The outputting the sound includes outputting a first sound as the sound when timing when the output condition is satisfied is not in a time range based on the designation information and outputting a second sound different from the first sound as the sound when the timing when the output condition is satisfied is in the time range based on the designation information.

Another exemplary embodiment provides a non-transitory computer-readable storage medium with an executable program stored thereon. Designation information includes at least one of time information based on a prescribed period, of a limited-time event held for the prescribed period in a game application and trigger information based on a game instance that occurs in the game application. The program causes a computer to perform receiving designation information from another information processing apparatus that executes the game application, determining whether or not an output condition is satisfied, determining, when the output condition is satisfied, whether or not timing when the output condition is satisfied is in a time range based on the designation information, outputting a first sound as the sound when the timing when the output condition is satisfied is not in the time range based on the designation information, and outputting a second sound different from the first sound as the sound when the timing when the output condition is satisfied is in the time range based on the designation information.

Another exemplary embodiment provides a method performed in an information processing apparatus configured to output a sound. Designation information includes at least one of time information based on a prescribed period, of a limited-time event held for the prescribed period in a game application and trigger information based on a game instance that occurs in the game application. The method includes receiving designation information from another information processing apparatus that executes a game application, determining whether or not an output condition is satisfied, determining, when the output condition is satisfied, whether or not timing when the output condition is satisfied is in a time range based on the designation information, outputting a first sound as the sound when the timing when the output condition is satisfied is not in the time range based on the designation information, and outputting a second sound different from the first sound as the sound when the timing when the output condition is satisfied is in the time range based on the designation information.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIGS. 4A to 4C show exemplary illustrative non-limiting drawings illustrating typical exemplary processing performed in the system according to the present embodiment.

FIGS. 5A to 5C show exemplary illustrative non-limiting drawings each illustrating a data structure of designation information according to the present embodiment.

FIGS. 11A to 11C show exemplary illustrative non-limiting drawings illustrating exemplary setting of a special output period in the system according to the present embodiment.

FIG. 12 shows an exemplary illustrative non-limiting drawing illustrating another exemplary setting of the special output period in the system according to the present embodiment.

DETAILED DESCRIPTION OF NON-LIMITING EXAMPLE EMBODIMENTS

Figure 1:
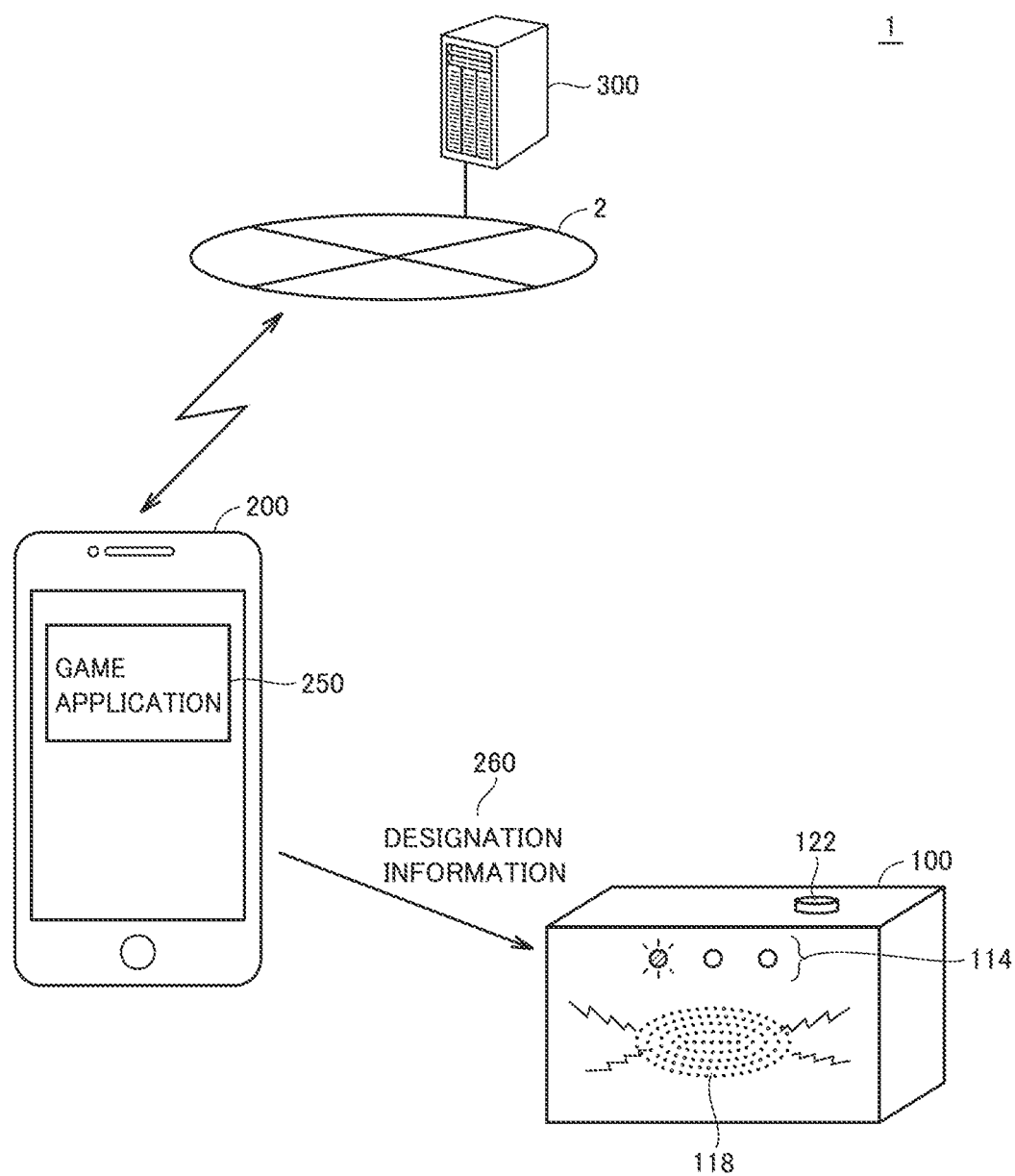
FIG. 1 shows an exemplary illustrative non-limiting drawing illustrating an overall configuration of a system according to the present embodiment.

The present embodiment will be described in detail with reference to the drawings. The same or corresponding elements in the drawings have the same reference characters allotted and description thereof will not be repeated.

The term "time" herein means not only time in a narrow sense but also date and time. For example, the "time" encompasses a case in which only time is specified without specifying a date (for example, 9:00 or the like) and a case in which a date and time are specified (for example, 9:00, July 1 or 9:00, Jul. 1, 2021). The term "time" does not limit accuracy (on an hour, minute, or second basis).

A. Exemplary Overall Configuration

An exemplary overall configuration of a system 1 according to the present embodiment will initially be described.

Referring to FIG. 1, system 1 includes an output apparatus 100 and a portable terminal 200. Output apparatus 100 and portable terminal 200 can exchange data through wireless communication or wired communication. When output apparatus 100 and portable terminal 200 are connected to each other through wireless communication, for example, any wireless scheme such as Bluetooth®, ZigBee®, wireless LAN (IEEE 802.11), or infrared communication can be adopted.

Output apparatus 100 is an information processing apparatus (a first information processing apparatus) configured to output a sound. Output apparatus 100 may be configured as a kind of an alarm clock.

Portable terminal 200 is an information processing apparatus (a second information processing apparatus) configured to execute one or more game applications 250. Portable terminal 200 is implemented, for example, by a smartphone, a tablet, a personal computer, or a game device.

System 1 may further include a server apparatus 300 that can communicate with portable terminal 200 over a network 2 (for example, the Internet). Server apparatus 300 instead of portable terminal 200 may be responsible for the entirety or a part of processing necessary for execution of game application 250. Server apparatus 300 may be a specific computer on the network or any computing resource present on the cloud.

Portable terminal 200 generates designation information 260 with execution or progress of game application 250 and transmits generated designation information 260 to output apparatus 100. Output apparatus 100 outputs a sound or the like in accordance with received designation information 260. Details of operations of output apparatus 100 in accordance with designation information 260 will be described later.

B. Exemplary Hardware Configuration

An exemplary hardware configuration of an apparatus included in system 1 according to the present embodiment will now be described.

b1: Output Apparatus 100

Figure 2:
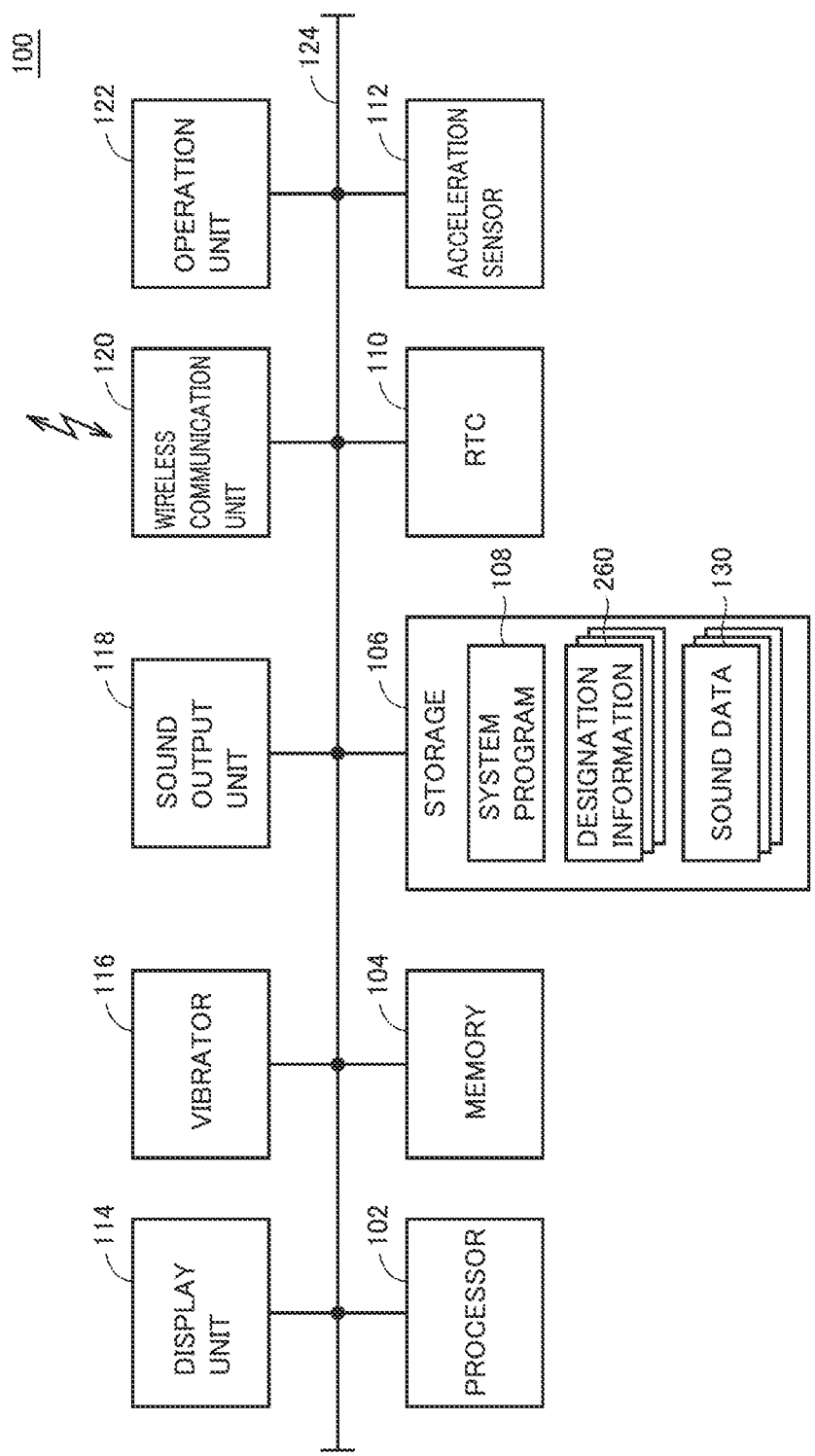
FIG. 2 shows an exemplary illustrative non-limiting drawing illustrating a hardware configuration of an output apparatus in the system according to the present embodiment.

Referring to FIG. 2, output apparatus 100 represents an exemplary computer, and includes, as its main components, a processor 102, a memory 104, a storage 106, a real time clock (RTC) 110, an acceleration sensor 112, a display unit 114, a vibrator 116, a sound output unit 118, a wireless communication unit 120, and an operation unit 122. These components are electrically connected to one another through a bus 124.

Processor 102 is a processing entity (a processing unit) for performing processing provided by output apparatus 100. Processor 102 performs processing as will be described later by reading a system program 108 stored in storage 106 and developing the system program on memory 104. System program 108 includes an instruction code for performing processing as will be described later.

Memory 104 is a storage device that can be accessed by processor 102, and it is implemented, for example, by a volatile storage device such as a dynamic random access memory (DRAM) or a static random access memory (SRAM). Storage 106 is implemented, for example, by a non-volatile storage device such as a flash memory.

In storage 106, one or more pieces of designation information 260 transmitted from portable terminal 200 and sound data 130 may be stored in addition to system program 108.

RTC 110 manages time and provides information indicating current time to processor 102 or the like.

Acceleration sensor 112 is a sensor that detects motion produced in output apparatus 100 and used for measurement of a sleep state of a user as will be described later.

Display unit 114 is a component that visually provides information to a user, and it is implemented, for example, by a light emitting diode (LED) or a liquid crystal display.

Vibrator 116 provides vibration to a user.

Sound output unit 118 is vibrator 116 that provides any auditory information to a user, and it is implemented, for example, by a speaker or a buzzer.

Wireless communication unit 120 exchanges data with portable terminal 200 through a wireless signal.

Operation unit 122 is vibrator 116 that accepts an operation from a user, and it is implemented by such a device as a push button, a control lever, a touch panel, a mouse, and the like.

b2: Portable Terminal 200

Figure 3:
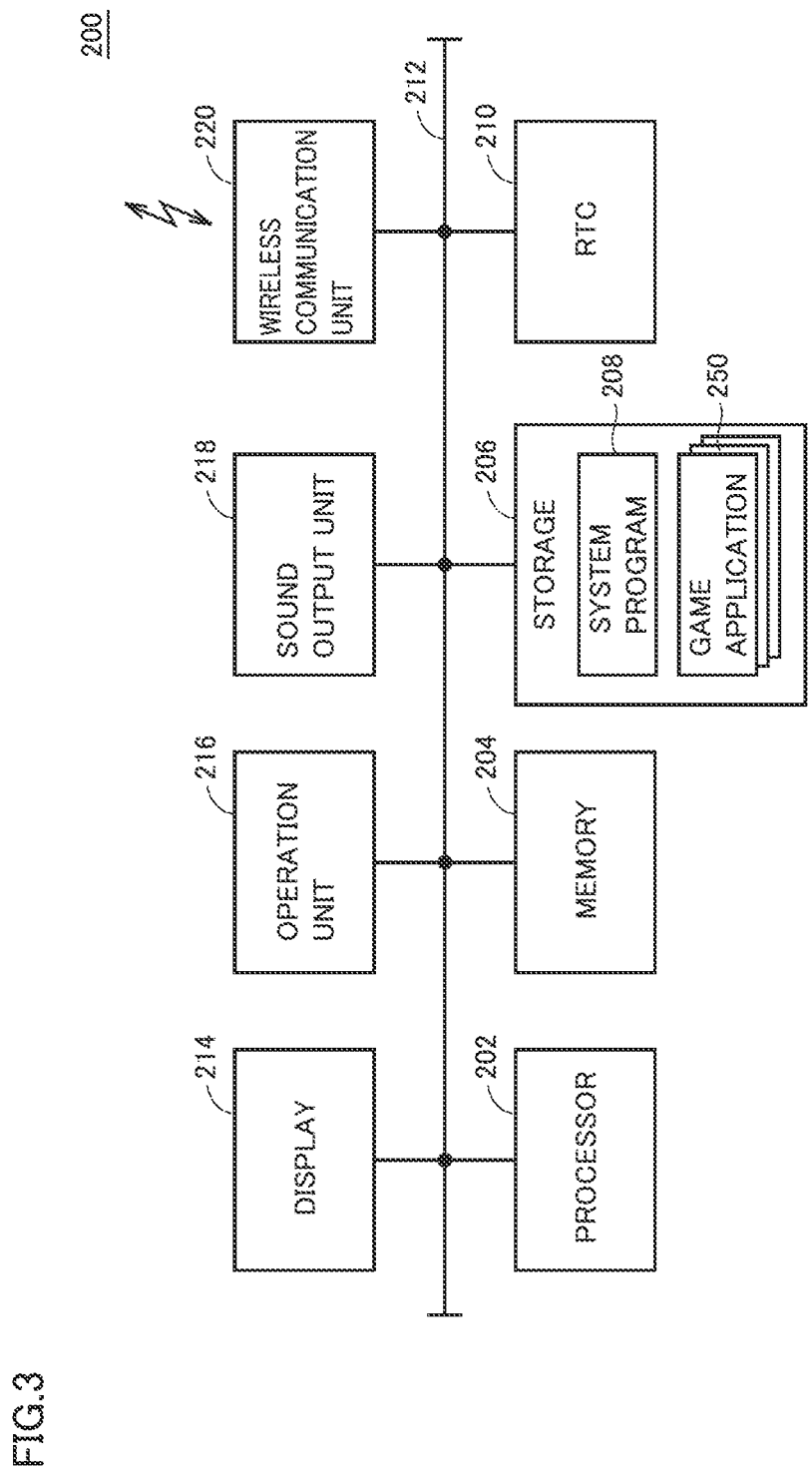
FIG. 3 shows an exemplary illustrative non-limiting drawing illustrating a hardware configuration of a portable terminal in the system according to the present embodiment.

Referring to FIG. 3, portable terminal 200 represents an exemplary computer, and includes, as its main components, a processor 202, a memory 204, a storage 206, an RTC 210, a display 214, an operation unit 216, a sound output unit 218, and a wireless communication unit 220. These components are electrically connected to one another through a bus 212.

Processor 202 is a processing entity (a processing unit) for performing processing provided by portable terminal 200. Processor 202 performs processing as will be described later by reading a system program 208 and game application 250 stored in storage 206 and developing them on memory 204. System program 208 includes an instruction code for performing processing as will be described later.

Memory 204 is a storage device that can be accessed by processor 202, and it is implemented, for example, by a volatile storage device such as a DRAM or an SRAM. Storage 206 is implemented, for example, by a non-volatile storage device such as a flash memory and a hard disk.

RTC 210 manages time and provides information indicating current time to processor 202 or the like.

Display 214 shows an image generated as a result of information processing performed in processor 202.

Operation unit 216 accepts an operation from a user of portable terminal 200. Operation unit 216 is implemented, for example, by a touch panel and/or a mouse.

Wireless communication unit 220 exchanges data with output apparatus 100 through a wireless signal.

b3: Others

Processing performed in output apparatus 100 and/or portable terminal 200 may be performed by execution of a program by the processor, or a part or the entirety thereof may be implemented by hard-wired circuitry such as an application specific integrated circuit (ASIC) or a field programmable gate array (FPGA).

The term "processor" herein encompasses not only an ordinary meaning of a processing circuit that performs processing in accordance with an instruction code described in a program, such as a central processing unit (CPU), a micro processing unit (MPU), or a graphics processing unit (GPU), but also hard-wired circuitry such as an ASIC or an FPGA. In the hard-wired circuitry such as an ASIC or an FPGA, a circuit corresponding to processing to be executed is formed in advance. Furthermore, the "processor" herein also encompasses circuitry in which a plurality of functions are integrated, such as a system on chip (SoC).

C. Typical Exemplary Processing

Typical exemplary processing performed in system 1 according to the present embodiment will initially be described.

FIG. 4A shows an exemplary ordinary operation of output apparatus 100. When an output condition 136 is satisfied, output apparatus 100 outputs a sound. A sound outputted when output condition 136 is satisfied is also referred to as an "ordinary sound 132" below for the sake of convenience.

When output apparatus 100 is implemented as an alarm clock, arrival of start time which is time to start output of a sound can be adopted as output condition 136. In this case, when the start time set in advance comes, output condition 136 is satisfied, that is, output condition 136 is met. Output condition 136 is not limited to the start time to start output of a sound but any condition can be adopted.

FIG. 4B shows an exemplary operation when output apparatus 100 receives designation information 260 including time information. Designation information 260 shown in FIG. 4B is associated with a limited-time event 252 held for a prescribed period in game application 250 executed in portable terminal 200.

The "time information" herein means information that directly or indirectly designates a period in connection with limited-time event 252. For example, the time information may be generated based on a prescribed period for which limited-time event 252 is held.

Limited-time event 252 encompasses any processing different from ordinary processing performed in game application 250. For example, in limited-time event 252, a user may be able to acquire a new character or item or a reward by an operation by the user. Alternatively, in limited-time event 252, the user may be able to fight with a new enemy different from an ordinary enemy, or may be able to enter a new dungeon. Typically, in limited-time event 252, when the user defeats an enemy character by an operation by the user, the user may be given a prescribed reward.

Designation information 260 designates an additional condition for output of a sound different from ordinary sound 132 as the sound to be outputted by output apparatus 100 when output condition 136 is satisfied. A sound different from ordinary sound 132 is also referred to as a "special sound 134" below for the sake of convenience.

Special sound 134 may include, for example, such contents as giving a notification about holding of limited-time event 252. Alternatively, at least one of ordinary sound 132 and special sound 134 may be any alarm sound (for example, a sound such as blip). With the alarm sound, a function as the alarm clock can effectively be exhibited. Special sound 134 may further include any contents relating to limited-time event 252.

Designation information 260 is information transmitted from portable terminal 200 to output apparatus 100. An additional condition designated by designation information 260 may include designation of a time range. A period set by reception of designation information 260 by output apparatus 100 is also referred to as a "special output period 138" below. Therefore, special output period 138 represents an exemplary time range based on designation information 260. Special output period 138 may be a range start time and ending time of which are both designated or a range only one of start time and ending time of which is designated. When start time alone is designated, a period after the designated start time permanently lasts as special output period 138, and when ending time alone is designated, special output period 138 lasts all the way until the designated ending time.

When output condition 136 is satisfied with special output period 138 having been designated, output apparatus 100 further determines whether or not timing when output condition 136 is satisfied is included in special output period 138. When the timing when output condition 136 is satisfied is included in special output period 138 as shown in FIG. 4B, output apparatus 100 outputs special sound 134 instead of ordinary sound 132.

When the timing when output condition 136 is satisfied is not included in special output period 138, output apparatus 100 outputs ordinary sound 132 as in FIG. 4A.

Special sound 134 outputted when the timing when output condition 136 is satisfied is included in special output period 138 may be designated by designation information 260 that designates special output period 138. Alternatively, special sound 134 to be outputted may be selected under a predetermined rule.

FIG. 4C shows an exemplary operation when output apparatus 100 receives designation information 260 including trigger information. Designation information 260 (trigger information) shown in FIG. 4C is associated with a game instance 254 that occurs in game application 250 executed in portable terminal 200. The trigger information may thus be generated based on game instance 254 that occurs in game application 250.

Game instance 254 encompasses any result produced with progress of game application 250. For example, game instance 254 includes such an instance as acquisition of a new character or item, gain of a reward, and change of a level by an explicit or implicit operation by a user.

Output apparatus 100 sets special output period 138 to be used as a condition for output therefrom of special sound 134 instead of ordinary sound 132 when output condition 136 is satisfied, based on designation information 260 including the trigger information. Designation information 260 including the trigger information is transmitted from portable terminal 200 to output apparatus 100 after game instance 254 occurs.

Processing with special output period 138 having been designated is the same as in FIG. 4B.

As described above, in system 1 according to the present embodiment, a sound to be outputted from output apparatus 100 can freely be changed by generating designation information 260 in accordance with progress or the like of game application 250 executed in portable terminal 200 and transmitting the designation information to output apparatus 100.

D. Exemplary Data Structure of Designation Information 260

An exemplary data structure of designation information 260 will now be described.

Designation information 260 shown in FIG. 5A includes identification information 261, start time 262, and ending time 263.

Identification information 261 is any identification information provided for distinguishing designation information 260 from another piece of designation information 260. A value of identification information 261 may be managed by game application 250 executed in portable terminal 200.

Start time 262 is time indicating start of special output period 138. Ending time 263 is time indicating end of special output period 138. Therefore, special output period 138 is started from time designated by start time 262 and ends at time designated by ending time 263.

Only one of the start time and the ending time of special output period 138 can also be designated, and in this case, a valid value is not set for one of start time 262 and ending time 263.

FIG. 5B shows an example in which a length of a period for which special output period 138 lasts is designated instead of ending time 263 of special output period 138. More specifically, designation information 260 shown in FIG. 5B includes identification information 261, start time 262, and a duration 264. Duration 264 indicates a length of a period for which special output period 138 lasts.

Further information may be added to designation information 260 shown in FIG. 5A or 5B.

Designation information 260 shown in FIG. 5C includes sound designation information 265, priority information 266, and number-of-times-of-output management information 267 in addition to identification information 261, start time 262, and ending time 263.

Sound designation information 265 indicates a type of a sound to be outputted as special sound 134. In other words, sound designation information 265 is information designating a type of special sound 134. As will be described later, when a plurality of sounds can be outputted as special sound 134, sound designation information 265 serves as information for selecting which sound is to be outputted as special sound 134.

Priority information 266 is information that designates a priority. When a plurality of pieces of designation information 260 are stored in output apparatus 100, special output periods 138 designated by pieces of designation information 260 may overlap with each other. In such a case, which special output period 138 (that is, designation information 260) should be prioritized is determined based on priority information 266.

Number-of-times-of-output management information 267 is information that designates the number of times of output of special sound 134 to be provided during special output period 138 designated by identical designation information 260. Number-of-times-of-output management information 267 is used also for management of the number of times of output of special sound 134 that was provided. As will be described later, number-of-times-of-output management information 267 is made use of in an example where output of special sound 134 only once during one special output period 138 is desired.

All of sound designation information 265, priority information 266, and number-of-times-of-output management information 267 shown in FIG. 5C do not have to be included in designation information 260, and any one or more of them may be included in designation information 260. Exemplary use of such information will be described later.

The data structure of designation information 260 is not limited to those shown in FIGS. 5A to 5C, and any data structure with which functions and processing described herein can be performed can be adopted.

E. Processing Procedure in Output Apparatus 100

A typical processing procedure performed in output apparatus 100 according to the present embodiment will be described with reference to FIG. 6. Each step shown in FIG. 6 may be performed by execution of system program 108 by processor 102 of output apparatus 100.

Figure 6:
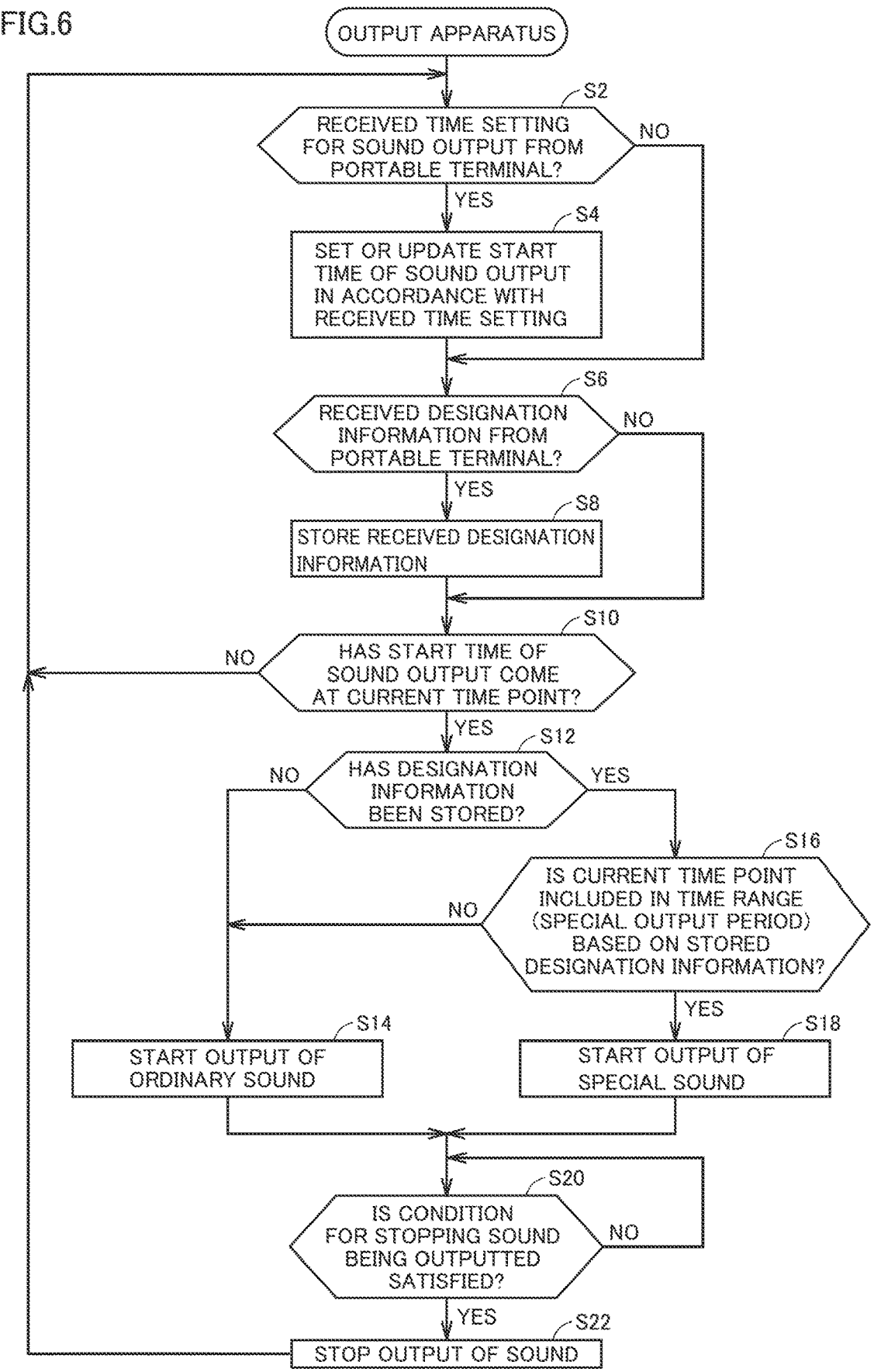
FIG. 6 shows an exemplary illustrative non-limiting flowchart illustrating a typical processing procedure performed by the output apparatus according to the present embodiment.

Referring to FIG. 6, output apparatus 100 determines whether or not it has received time setting for sound output from portable terminal 200 (step S2). When output apparatus 100 has received time setting for sound output from portable terminal 200 (YES in step S2), output apparatus 100 sets or updates start time of sound output in accordance with the received time setting (step S4). When output apparatus 100 has not received time setting for sound output from portable terminal 200 (NO in step S2), processing in step S4 is skipped.

In succession, output apparatus 100 performs processing for receiving designation information 260 from portable terminal 200 that executes game application 250. More specifically, output apparatus 100 determines whether or not it has received designation information 260 from portable terminal 200 (step S6). When output apparatus 100 has received designation information 260 from portable terminal 200 (YES in step S6), output apparatus 100 has received designation information 260 stored (step S8). When output apparatus 100 has not received designation information 260 from portable terminal 200 (NO in step S6), processing in step S8 is skipped.

In succession, output apparatus 100 determines whether or not an output condition has been satisfied. More specifically, output apparatus 100 determines whether or not start time of sound output has come at the current time point (step S10). When the start time of sound output has not yet come at the current time point (NO in step S10), the present process ends and processing in step S2 or later is repeated.

When the start time of sound output has come at the current time point (YES in step S10), output apparatus 100 determines whether or not timing when the output condition (arrival of the start time of sound output) is satisfied is included in a time range (special output period 138) based on designation information 260 (steps S12 to S16).

More specifically, output apparatus 100 determines whether or not designation information 260 has been stored (step S12). When designation information 260 has not been stored (NO in step S12), output apparatus 100 starts output of ordinary sound 132 (step S14).

When designation information 260 has been stored (YES in step S12), output apparatus 100 determines whether or not the current time point is included in the time range (special output period 138) based on stored designation information 260 (step S16). When the current time point is not included in special output period 138 designated by stored designation information 260 (NO in step S16), processing in step S14 is performed. Specifically, when the timing when the output condition is satisfied is not included in special output period 138, output apparatus 100 performs processing for output of ordinary sound 132 as the sound.

When the current time point is included in special output period 138 designated by stored designation information 260 (YES in step S16), output of special sound 134 different from ordinary sound 132 is started (step S18). Specifically, when the timing when the output condition is satisfied is included in special output period 138, output apparatus 100 performs processing for output of special sound 134 as the sound.

After step S14 or step S18 is performed, output apparatus 100 determines whether or not a condition for stopping the sound that is being outputted is satisfied (step S20). When the condition for stopping the sound that is being outputted is not satisfied (NO in step S20), output of the sound is continued and processing in step S20 is repeated.

When the condition for stopping the sound that is being outputted is satisfied (YES in step S20), output apparatus 100 stops output of the sound (step S22). Then, processing in step S2 or later is repeated.

Without being limited to time setting for sound output from portable terminal 200, the user may set or update time of sound output by operating output apparatus 100. Alternatively, output apparatus 100 may set or update time of sound output in accordance with a predetermined logic. In such a case, processing in steps S2 and S4 may be skipped.

F. Exemplary Processing as Applications

Some exemplary processing as applications performed in system 1 according to the present embodiment will now be described.

f1: Plurality of Sound Types and Designation of Sound Type

Output apparatus 100 may be configured to output a plurality of types of special sounds 134 in addition to ordinary sound 132. In this case, output apparatus 100 outputs special sound 134 of a type selected from among a plurality of types of special sounds 134 prepared in advance.

Figure 7:
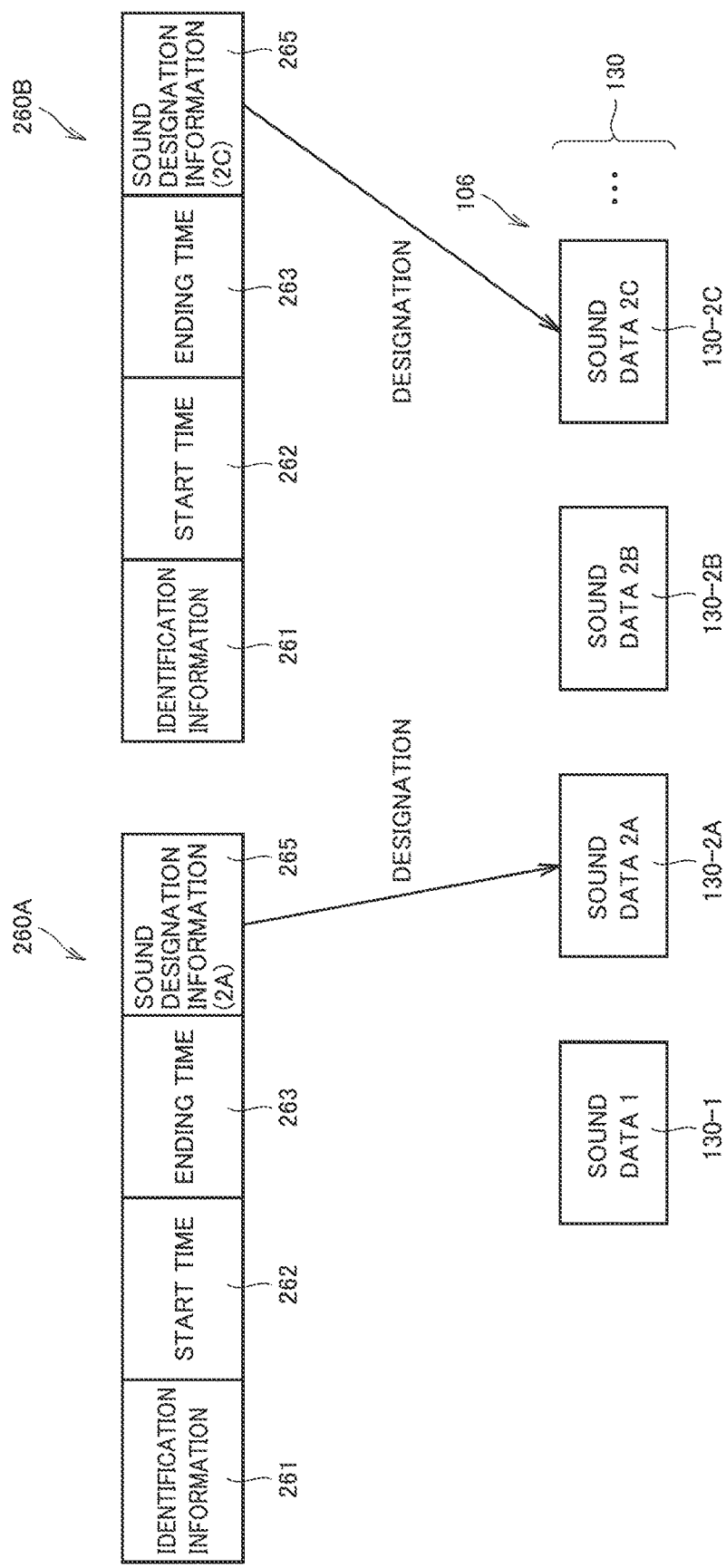
FIG. 7 shows an exemplary illustrative non-limiting drawing illustrating processing involved with sound output from the output apparatus according to the present embodiment.

Referring to FIG. 7, a plurality of pieces of sound data 130 are stored in storage 106 of output apparatus 100. Sound data 130 is a sound source for output of a sound. The plurality of pieces of sound data 130 include sound data 130-1 for output of ordinary sound 132 and pieces of sound data 130-2A, 130-2B, 130-2C, . . . for output of special sound 134.

Sound data 130 to be used may be selected with the use of sound designation information 265 in designation information 260. For example, sound designation information 265 in designation information 260A designates sound data 130-2A and sound designation information 265 in designation information 260B designates sound data 130-2B. Output apparatus 100 may thus output special sound 134 of a type designated by designation information 260 (sound designation information 265) when the timing when output condition 136 is satisfied is included in the time range (special output period 138) based on designation information 260.

Game application 250 executed in portable terminal 200 generates designation information 260 including sound designation information 265 in accordance with a type of special sound 134 output of which is desired.

Sound data 130 for output of special sound 134 may be provided from portable terminal 200 to output apparatus 100. In other words, output apparatus 100 may obtain sound data 130 for output of special sound 134 from portable terminal 200.

f2: Priority

When output apparatus 100 sets special output periods 138 based on a plurality of pieces of designation information 260, respectively, special output periods 138 may overlap with each other. In this case, special sound 134 to be outputted may be determined based on a priority.

Figure 8:
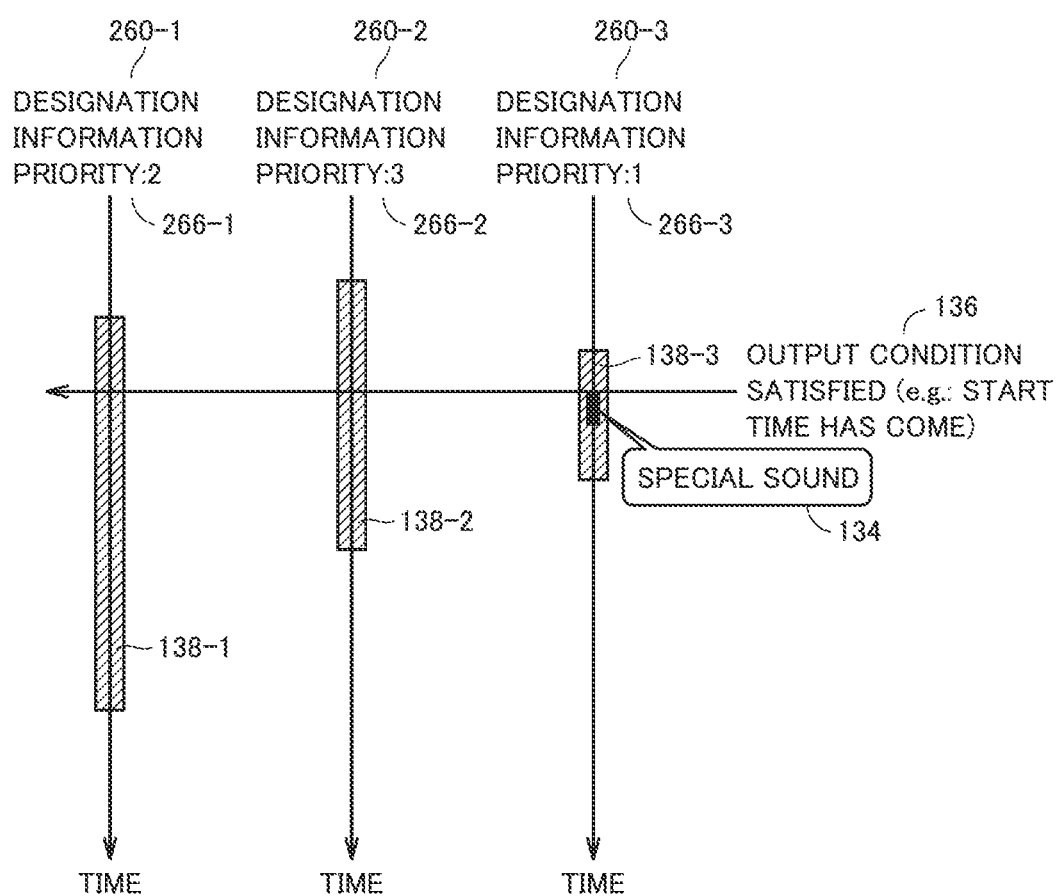
FIG. 8 shows an exemplary illustrative non-limiting drawing illustrating processing using priority information in the output apparatus according to the present embodiment.

Referring to FIG. 8, it is assumed that three pieces of designation information 260-1 to 260-3 designate special output periods 138-1 to 138-3, respectively.

It is assumed that output condition 136 is satisfied at certain timing in this state. As shown in FIG. 8, timing when output condition 136 is satisfied is included in all of special output periods 138-1 to 138-3. Therefore, which special sound 134 corresponding to which special output period 138 should be outputted has to be determined.

In FIG. 8, pieces of designation information 260-1 to 260-3 include pieces of priority information 266-1 to 266-3, respectively. Output apparatus 100 determines designation information 260 for output of special sound 134 based on the pieces of priority information 266-1 to 266-3 included in respective pieces of designation information 260-1 to 260-3. In the example shown in FIG. 8, "1" indicating the highest priority is set for priority information 266-3 in designation information 260-3.

When the timing when output condition 136 is satisfied is included in all of the time ranges (special output periods 138) based on the plurality of pieces of designation information 260, output apparatus 100 outputs special sound 134 of a type designated by one piece of designation information 260 in accordance with the priority, among the plurality of pieces of designation information 260. In the example in FIG. 8, output apparatus 100 outputs the sound of a type designated by designation information 260-3 as special sound 134, in accordance with priority information 266-3.

By thus including priority information 266 in identification information 260, even when special output periods 138 designated by pieces of designation information 260 overlap with each other, one special sound 134 can be outputted without contention.

f3: Simultaneous Output

Regardless of the priority as described above, sounds of different kinds (for example, a melody and an announcement) may simultaneously be outputted. In this case, output apparatus 100 may output any announcement while it plays a melody.

f4: The Number of Times of Output

For example, when a relatively long period is designated as special output period 138, output condition 136 may be satisfied a plurality of times during identical special output period 138. In such a case, there are also needs for restriction or control of the number of times of output of special sound 134. In order to meet such needs, designation information 260 can include number-of-times-of-output management information 267.

Figure 9:
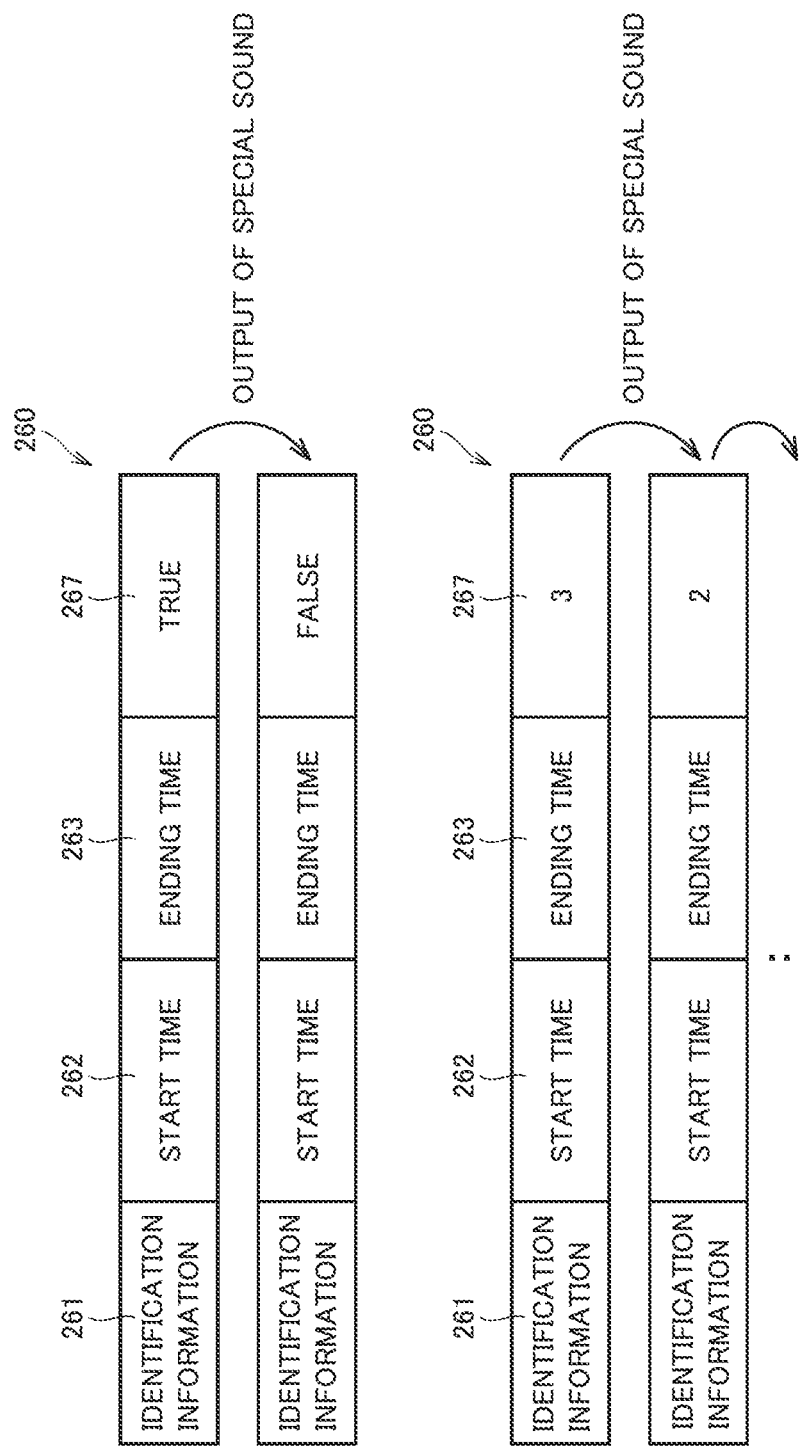
FIGS. 9A to 9C show exemplary illustrative non-limiting drawings illustrating processing using number-of-times-of-output management information in the output apparatus according to the present embodiment.

Referring to FIG. 9A, designation information 260 includes number-of-times-of-output management information 267 in addition to identification information 161, start time 262, and ending time 263. A valid value, however, is not set for number-of-times-of-output management information 267. In this case, output apparatus 100 determines that there is no restriction on the number of times of output of special sound 134. Then, when timing when output condition 136 is satisfied is included in special output period 138, output apparatus 100 outputs special sound 134 regardless of the number of times of output before that.

For number-of-times-of-output management information 267 in designation information 260 shown in FIG. 9B, "TRUE" indicating that the number of times of output is valid has been set. In this case, when output apparatus 100 outputs special sound 134, a value for number-of-times-of-output management information 267 in stored designation information 260 is updated from "TRUE" to "FALSE". In other words, the value for number-of-times-of-output management information 267 set to "FALSE" means that special sound 134 has been outputted (has already been outputted).

When the timing when output condition 136 is satisfied is included in special output period 138, output apparatus 100 outputs special sound 134 only when number-of-times-of-output management information 267 in designation information 260 has been set to "TRUE". By using number-of-times-of-output management information 267 as shown in FIG. 9B, such control as outputting special sound 134 only once can be implemented. When number-of-times-of-output management information 267 in designation information 260 has been set to "FALSE", output apparatus 100 outputs ordinary sound 132.

Thus, even when the timing when output condition 136 is satisfied is included in the time range (special output period 138) based on designation information 260, output apparatus 100 may output ordinary sound 132 instead of special sound 134 when it has ever outputted special sound 134.

For number-of-times-of-output management information 267 in designation information 260 shown in FIG. 9C, "3" is set as the value indicating the number of times of output. In this case, each time output apparatus 100 outputs special sound 134, it decrements by one, the value for number-of-times-of-output management information 267 in stored designation information 260. For example, when output apparatus 100 outputs special sound 134 once, it updates the value for number-of-times-of-output management information 267 from "3" to "2". When the value for number-of-times-of-output management information 267 has finally been set to "0", output apparatus 100 does not output special sound 134 any more. By using number-of-times-of-output management information 267 as shown in FIG. 9C, the maximum number of times of output of special sound 134 can be controlled. When number-of-times-of-output management information 267 in designation information 260 has been set to "0", output apparatus 100 outputs ordinary sound 132.

Thus, even when the timing when output condition 136 is satisfied is included in the time range (special output period 138) based on designation information 260, output apparatus 100 may output ordinary sound 132 instead of special sound 134 when the number of times of output of special sound 134 has reached the number of times designated by designation information 260 (number-of-times-of-output management information 267).

f5: Change of Sound

The type of a sound outputted from output apparatus 100 may be changed over time.

Figure 10:
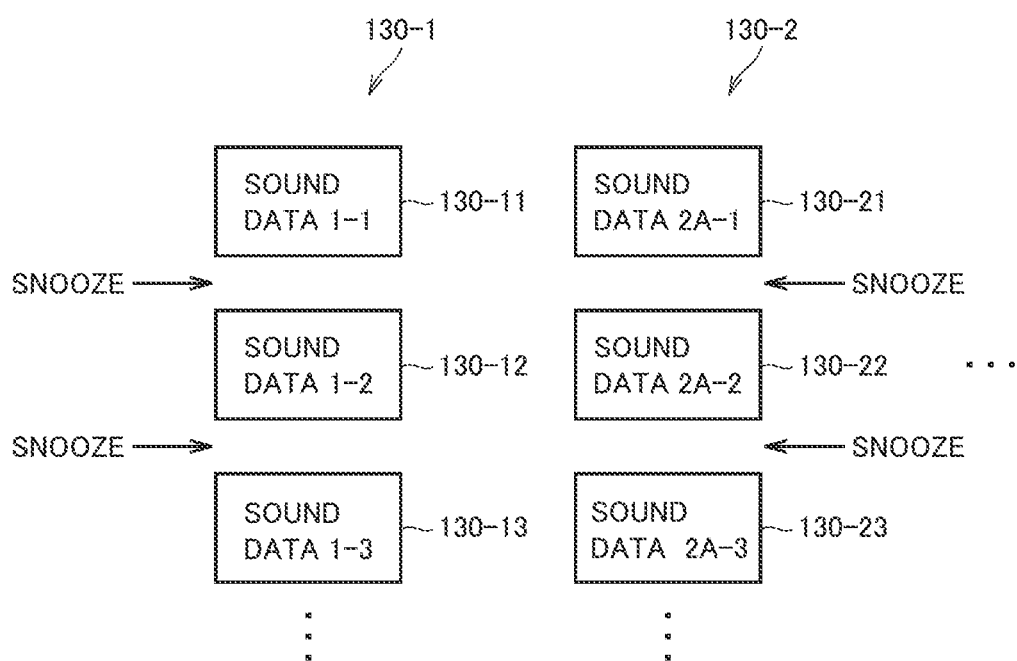
FIG. 10 shows an exemplary illustrative non-limiting drawing illustrating processing for changing over time a sound outputted from the output apparatus according to the present embodiment.

Referring to FIG. 10, it is assumed that sound data 130-1 for output of ordinary sound 132 and sound data 130-2 for output of special sound 134 are stored as a plurality of pieces of sound data 130 in output apparatus 100.

Sound data 130-1 may be a set of a plurality of pieces of sound data 130-11, 130-12, 130-13, . . . . Similarly, sound data 130-2 may be a set of a plurality of pieces of sound data 130-21, 130-22, 130-23, . . . .

For example, when output apparatus 100 plays sound data 130-11 as ordinary sound 132 and thereafter a user performs a snooze (processing for stopping sound output only for a prescribed period of time) operation, output apparatus 100 suspends output of ordinary sound 132. When a prescribed period of time thereafter elapses, output apparatus 100 resumes play of ordinary sound 132. At the time of resumption, however, output apparatus 100 plays sound data 130-12 instead of sound data 130-11. At the time of resumption after a further snooze operation, output apparatus 100 plays sound data 130-13 instead of sound data 130-12. The type of outputted ordinary sound 132 may thus be changed over time.

Similarly, when output apparatus 100 plays sound data 130-21 as special sound 134 and thereafter the user performs the snooze operation, output apparatus 100 suspends output of special sound 134. When a prescribed period of time thereafter elapses, output apparatus 100 resumes play of special sound 134. At the time of resumption, however, output apparatus 100 plays sound data 130-22 instead of sound data 130-21. At the time of resumption after a further snooze operation, output apparatus 100 plays sound data 130-23 instead of sound data 130-22. The type of outputted special sound 134 may thus be changed over time.

FIG. 10 illustrates processing when the snooze operation is performed. Without being limited as such, the type or contents of a sound to be outputted may be changed simply with lapse of time.

f6: Output Condition

The description above exemplifies arrival of the set start time as a typical example of output condition 136. In other words, the description exemplifies output condition 136 when output apparatus 100 is configured as an alarm clock. Without being limited as such, any condition can be set. For example, reception of an operation by the user onto operation unit 122 of output apparatus 100 may be adopted as a trigger (an instance that output condition 136 has been satisfied). In other words, reception of a prescribed operation by the user may be adopted as output condition 136. In this case, when the user operates operation unit 122 of output apparatus 100 and timing of that operation is included in special output period 138, output apparatus 100 outputs special sound 134, and otherwise, output apparatus 100 outputs ordinary sound 132.

Alternatively, one or more of a case in which game application 250 has not been started up in portable terminal 200 for a long period, a case in which a remaining capacity of a battery of output apparatus 100 is low, and a case in which output apparatus 100 has not been in coordination with portable terminal 200 for a long period may be adopted as output condition 136. By adopting such output condition 136, when the user has not operated output apparatus 100 for a while, user's interest in output apparatus 100 can be recalled.

f7: Deletion of Designation Information

Designation information 260 stored in output apparatus 100 may be deleted under any condition and at any timing.

For example, in an example in which an upper limit number of pieces of designation information 260 storable in output apparatus 100 has been set, when pieces of designation information 260 exceeding the upper limit number are received, designation information 260 oldest in day of reception may automatically be deleted.

Among pieces of stored designation information 260, designation information 260, special output period 138 designated by which has already expired (special output period 138 having time in the past), may periodically be searched for and automatically be deleted.

Designation information 260 stored in output apparatus 100 may be deleted in accordance with an instruction from portable terminal 200.

G. Exemplary Setting of Special Output Period

Exemplary setting of special output period 138 will now be described.

FIGS. 11A to 11C show exemplary designation information 260 including time information.

FIG. 11A shows an example in which limited-time event 252 is started from time t12 and ends at time t13. For limited-time event 252, special output period 138 that is started from time t11 and ends at time t13 may be set. In the example shown in FIG. 11A, the start time (time t11) of special output period 138 before the start time (time t12) of limited-time event 252 is set.

In this case, the time information associated with limited-time event 252 may include at least one of a time range (time t11 to time t13) including a period before start of the period for which limited-time event 252 is held and time (time t11) before the start of the period for which limited-time event 252 is held. At this time, the time range (special output period 138) based on designation information 260 is started from time included in the time information.

In an example in which special sound 134 includes such contents as giving a notification about holding of limited-time event 252, when the start time of special output period 138 is too earlier than the start time of limited-time event 252, an interval from output of special sound 134 until holding of limited-time event 252 can be too long. Therefore, a time interval between the start time of limited-time event 252 and the start time of special output period 138 may be within twenty-four hours.

In other words, the time range (special output period 138) based on designation information 260 may begin from the time set within twenty-four hours before the start of the period for which limited-time event 252 is held.

Typically, time when it becomes a day of holding of limited-time event 252 may be set as the start time of special output period 138. For example, when limited-time event 252 is held from 9:00 on Jul. 1, 2021, 0 AM on the day of holding (0:00 on Jul. 1, 2021) may be set as the start time of special output period 138. By setting special output period 138 as such, a user who has been expecting holding of limited-time event 252 by hearing special sound 134 can be prevented from being disappointed to find that holding of limited-time event 252 is long way off.

FIG. 11B shows an example in which both of limited-time event 252 and special output period 138 are started from time t21 and end at time t22. In the example shown in FIG. 11B, start of the time range (special output period 138) based on designation information 260 coincides with start of the period for which limited-time event 252 is held. Furthermore, the end of the time range (special output period 138) based on designation information 260 coincides with the end of the period for which limited-time event 252 is held.

In other words, the time range (special output period 138) based on designation information 260 coincides with the period for which limited-time event 252 is held. By setting such special output period 138, during the period for which limited-time event 252 is held, special sound 134 is outputted when output condition 136 is satisfied. Therefore, the user can be caused to more strongly associate output of special sound 134 with holding of limited-time event 252.

FIG. 11C shows an example in which limited-time event 252 is started from time t31 and ends at time t33. For limited-time event 252, special output period 138 that is started from time t31 and ends at time t32 may be set. Time t32 indicates time of the end of the period of output of special sound 134, which is before the end of limited-time event 252. In the example shown in FIG. 11C, start of the time range (special output period 138) based on designation information 260 coincides with start of the period for which limited-time event 252 is held. The end of the time range (special output period 138) based on designation information 260, however, is set to time before the end of the period for which limited-time event 252 is held.

By setting such special output period 138, such a situation that a user who has heard special sound 134 accesses limited-time event 252 a little late and finds that the limited-time event has already ended can be avoided.

In an example shown in FIG. 12, time t41 after occurrence of game instance 254 is set as the start time of special output period 138. Special output period 138 ends at time t42. Any length of time from time t41 until time t42 can be set.

In this case, the trigger information based on game instance 254 includes time t41 after occurrence of game instance 254. At this time, the time range (special output period 138) based on designation information 260 is started from time included in the trigger information.

H. Function to Measure Sleep State

When output apparatus 100 is implemented as an alarm clock as described above, output apparatus 100 is assumed as being arranged in the vicinity of a user when the user goes to bed. Therefore, output apparatus 100 may perform a function to measure a sleep state of the user.

Measurement of the sleep state of the user may be implemented by any hardware. Output apparatus 100 measures the sleep state of the user with acceleration sensor 112. More specifically, output apparatus 100 is arranged on bedclothes (a mattress or the like) on which the user lies, so as to detect motion produced by the user during sleep.

Output apparatus 100 measures the sleep state of the user by detecting motion of the sleeping user with acceleration sensor 112.

Output apparatus 100 may transmit information indicating the measured sleep state of the user (for example, change over time in sleep state) to portable terminal 200. Portable terminal 200 may have game application 250 progress based on information indicating the sleep state of the user from output apparatus 100.

For example, when the user is determined as having sufficiently slept, such an output as suggesting good sleep may be presented to the user, and when the user is determined as having insufficiently slept, such an output as suggesting lack of sleep may be presented to the user.

Any progress of game application 250 based on the information indicating the sleep state of the user may be applicable.

Without being limited to the configuration in which the sleep state of the user is measured with acceleration sensor 112, any principles and hardware for measuring the sleep state of the user may be adopted.

I. Exemplary Functional Configuration

An exemplary configuration of output apparatus 100 according to the present embodiment will now be described.

Figure 13:
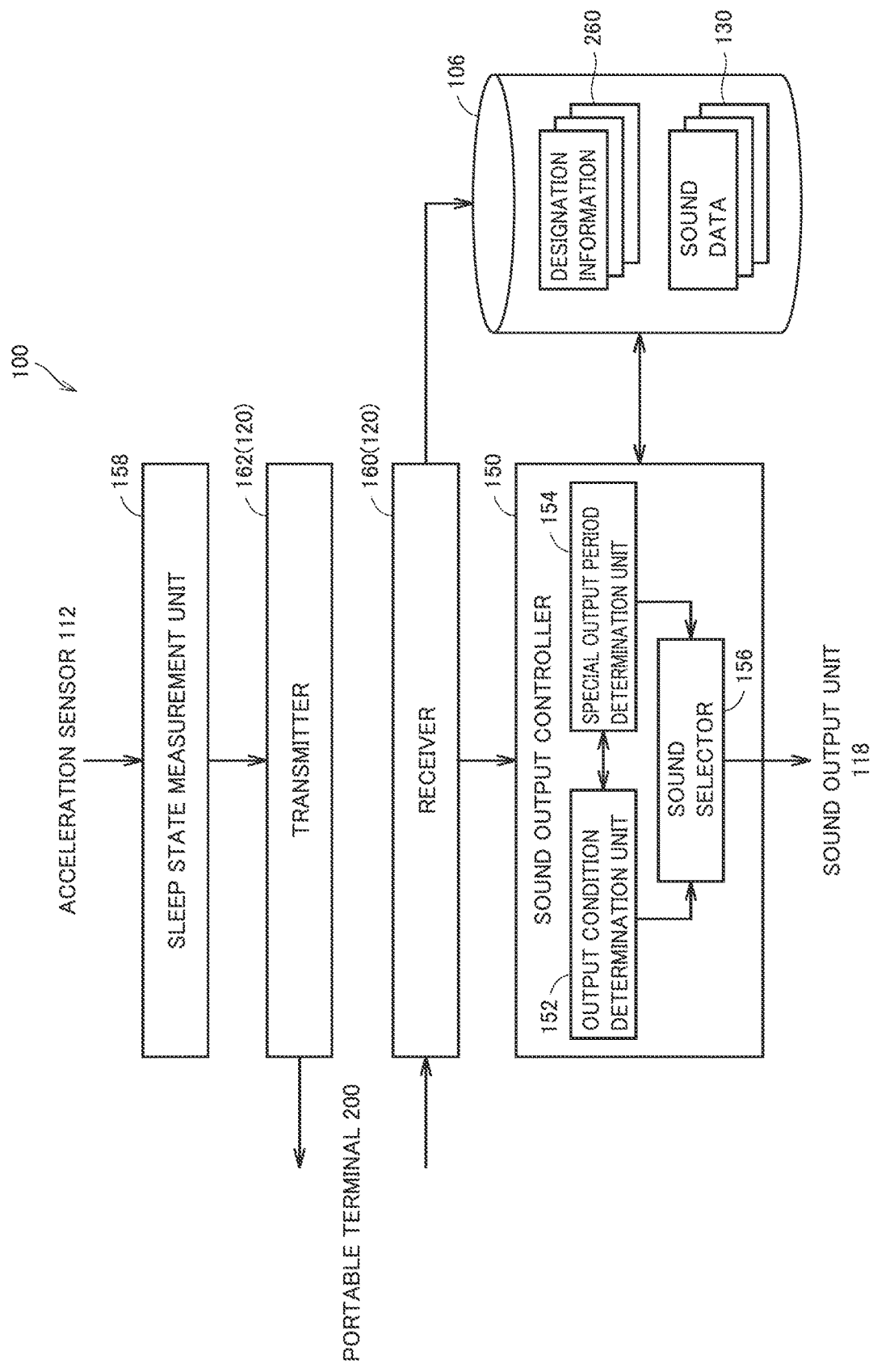
FIG. 13 shows an exemplary illustrative non-limiting drawing illustrating an exemplary functional configuration of the output apparatus according to the present embodiment.

Referring to FIG. 13, output apparatus 100 includes, as its main functional components, a sound output controller 150, a sleep state measurement unit 158, a receiver 160, and a transmitter 162. These functional components are implemented by execution of system program 108 by processor 102 of output apparatus 100.

Sound output controller 150 controls sound output from sound output unit 118. When output condition 136 is satisfied, sound output controller 150 has the sound outputted. More specifically, sound output controller 150 includes an output condition determination unit 152, a special output period determination unit 154, and a sound selector 156.

Output condition determination unit 152 determines whether or not output condition 136 is satisfied. When output condition determination unit 152 determines that output condition 136 is satisfied, it notifies special output period determination unit 154 and sound selector 156 of that fact.

Special output period determination unit 154 determines whether or not timing when output condition 136 is satisfied is included in the time range (special output period 138) based on designation information 260. Special output period determination unit 154 notifies sound selector 156 of a result of determination.

Sound selector 156 selects sound data 130 to be outputted in response to the notification from output condition determination unit 152 and special output period determination unit 154, and outputs selected sound data 130 to sound output unit 118. More specifically, when the timing when output condition 136 is satisfied is not included in special output period 138, sound selector 156 outputs sound data 130 corresponding to ordinary sound 132 as the sound, and when the timing is included in special output period 138, it selects sound data 130 corresponding to special sound 134 as the sound.

Sleep state measurement unit 158 measures the sleep state of the user present within a range of measurement based on a signal from acceleration sensor 112.

Receiver 160 receives designation information 260 from portable terminal 200 and has designation information 260 stored in storage 106. Receiver 160 obtains sound data 130 for output of special sound 134. Typically, receiver 160 receives sound data 130 from portable terminal 200 and has sound data 130 stored in storage 106.

Transmitter 162 transmits information indicating the sleep state measured by sleep state measurement unit 158 to portable terminal 200.

Functions of receiver 160 and transmitter 162 are performed by using wireless communication unit 120.

J. Other Embodiments

Though an exemplary configuration for output of a sound has been described, light or vibration may be outputted in addition to or instead of the sound. In this case as well, similarly to the sound, light or vibration may be outputted in a special manner different from an ordinary manner, based on limited-time event 252 and/or game instance 254.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing apparatus, comprising:
a communication interface configured to communicate with another information processing apparatus, wherein the another information processing apparatus is configured to execute a game application in which a limited-time event is held for a first period; and
one or more memories configured to store computer readable instructions that, when executed by one or more processors, cause the information processing apparatus to:
receive, from the another information processing apparatus, information indicating a first time and the first period;
obtain a current time;
determine whether a first condition is satisfied, wherein the first condition includes the current time reaching a time based on the first time;
determine whether a second condition is satisfied, wherein the second condition includes the first condition being satisfied within a second period based on the received first period;
output a first sound in association with the first condition being satisfied and the second condition not being satisfied; and
output a second sound, different from the first sound, in association with the first condition and the second condition being satisfied.

2. The information processing apparatus according to claim 1, wherein
the second sound is selected from among a plurality of types of sounds other than the first sound.

3. The information processing apparatus according to claim 1, wherein
the received information comprises information designating a type of the second sound, and
the second sound is output based on the information designating the type of the second sound.

4. The information processing apparatus according to claim 1, wherein the information processing apparatus is further caused to:

output the first sound in association with the first condition and the second condition being satisfied, and the second sound having ever been output.

5. The information processing apparatus according to claim 1, wherein
the received information further comprises information designating a number of times of output of the second sound, and
the first sound is output in association with the first condition and the second condition being satisfied and the second sound has been output the designated number of times.

6. The information processing apparatus according to claim 1, wherein the information processing apparatus is further caused to:
obtain data for output of the second sound from the another information processing apparatus.

7. The information processing apparatus according to claim 1, wherein
the second sound comprises content providing a notification about holding of the limited-time event.

8. The information processing apparatus of claim 1, wherein the information processing apparatus and the another information processing apparatus are within local range of each other.

9. The information processing apparatus of claim 1, wherein
the information processing apparatus includes an alarm device, and
the another information processing apparatus includes a terminal device.

10. A system, comprising:
a first information processing apparatus; and
a second information processing apparatus configured to executed a game application in which a limited-time event is held for a first period, wherein
the first information processing apparatus is configured to:
receive information, indicating a first time and the first period, from the second information processing apparatus;
obtain a current time;
determine whether a first condition is satisfied, wherein the first condition includes the current time reaching a time based on the first time;
determine whether a second condition is satisfied, wherein the second condition includes the first condition being satisfied within a second period based on the received first period;
output a first sound in association with the first condition being satisfied and the second condition not being satisfied; and
output a second sound, different from the first sound, in association with the first condition and the second condition being satisfied.

11. The system of claim 10, wherein
the second sound is selected from among a plurality of types of sounds other than the first sound.

12. The system of claim 10, wherein
the received information comprises information designating a type of the second sound, and
the second sound is output based on the information designating the type of the second sound.

13. The system of claim 10, wherein the first information processing apparatus is further configured to:
output the first sound in association with the first condition and the second condition being satisfied, and the second sound having ever been output.

14. A non-transitory computer readable storage medium configured to store computer readable instructions that, when executed by one or more processors of an information processing apparatus, cause the information processing apparatus to provide execution comprising:
receiving information, indicating a first time and a first period, from another information processing apparatus, wherein the another information processing apparatus is configured to execute a game application in which a limited-time event is held for the first period;
obtaining a current time;
determining whether a first condition is satisfied, wherein the first condition includes the current time reaching a time based on the first time;
determining whether a second condition is satisfied, wherein the second condition includes the first condition being satisfied within a second period based on the received first period;
outputting a first sound in association with the first condition being satisfied and the second condition not being satisfied; and
outputting a second sound, different from the first sound, in association with the first condition and the second condition being satisfied.

15. The non-transitory computer readable storage medium of claim 14, wherein
the second sound is selected from among a plurality of types of sounds other than the first sound.

16. The non-transitory computer readable storage medium of claim 14, wherein
the received information comprises information designating a type of the second sound, and
the second sound is output based on the information designating the type of the second sound.

17. The non-transitory computer readable storage medium of claim 14, wherein the information processing apparatus is further caused to provide execution comprising:
outputting the first sound in association with the first condition and the second condition being satisfied, and the second sound having ever been output.

18. A method implemented via an information processing apparatus, the method comprising:
receiving information, indicating a first time and a first period, from another information processing apparatus, wherein the another information processing apparatus is configured to execute a game application in which a limited-time event is held for the first period;
obtaining a current time;
determining whether a first condition is satisfied, wherein the first condition includes the current time reaching a time based on the first time;
determining whether a second condition is satisfied, wherein the second condition includes the first condition being satisfied within a second period based on the received first period;
outputting a first sound in association with the first condition being satisfied and the second condition not being satisfied; and
outputting a second sound, different from the first sound, in association with the first condition and the second condition being satisfied.

19. The method of claim 18, wherein
the second sound is selected from among a plurality of types of sounds other than the first sound.

20. The method of claim 18, wherein
the received information comprises information designating a type of the second sound, and the second sound is output based on the information designating the type of the second sound.

21. The method of claim 18, further comprising:

outputting the first sound in association with the first condition and the second condition being satisfied, and the second sound having ever been output.

* * * * *